United States Patent
Mansour et al.

[11] 3,883,689
[45] May 13, 1975

[54] SERVO-CONTROLLED INTRAVITAL MICROSCOPE SYSTEM

[75] Inventors: Momtaz N. Mansour; Harold J. Wayland, both of Pasadena; Carl P. Chapman, La Crescenta, all of Calif.

[73] Assignee: The United States of America as represented by the National Aeronautics and Space Administration Office of General Counsel-Code GP, Washington, D.C.

[22] Filed: Sept. 4, 1973

[21] Appl. No.: 394,149

[52] U.S. Cl. .......................... 178/7.2; 178/DIG. 29
[51] Int. Cl. .............................................. H04n 5/38
[58] Field of Search ....... 178/7.2, DIG. 29; 353/101

[56] References Cited
UNITED STATES PATENTS

| | | | |
|---|---|---|---|
| 3,622,797 | 11/1971 | Bragg | 250/234 |
| 3,708,619 | 1/1973 | Martin | 178/7.92 |
| 3,721,759 | 3/1973 | Lang | 178/7.2 |
| 3,786,184 | 1/1974 | Pieters | 178/7.2 |

Primary Examiner—Robert L. Griffin
Assistant Examiner—Mitchell Saffian
Attorney, Agent, or Firm—Monte F. Mott; Paul McCaul; John R. Manning

[57] ABSTRACT

This disclosure relates to a microscope system for viewing an area of a living body tissue that is rapidly moving, by maintaining the same area in the field-of-view and in focus. A focus sensing portion of the system includes two video cameras at which the viewed image is projected, one camera being slightly in front of the image plane and the other slightly behind it. A focus sensing circuit for each camera differentiates certain high frequency components of the video signal and then detects them and passes them through a low--pass filter, to provide DC focus signal whose magnitudes represent the degree of focus. An error signal equal to the difference between the focus signals, drives a servo that moves the microscope objective so that an in-focus view is delivered to an image viewing/recording camera. The lens system includes a moveable microscope objective which collimates rays from the object, and a transfer lens much larger than the objective lens for focusing the collimated rays onto the target plane of the viewing camera.

7 Claims, 17 Drawing Figures

SERVO-CONTROLLED INTRAVITAL MICROSCOPE SYSTEM

ORIGIN OF THE INVENTION

The invention described herein was made in the performance of work under a NASA contract and is subject to the provisions of Section 305 of the National Aeronautics and Space Acts of 1958, Public Law 85-568 (72 Stat. 435; 42 USC 2457).

BACKGROUND OF THE INVENTION

This invention relates to a system for viewing a moving object.

The microscopic examination of unrestrained and normally functioning living tissue has not been possible in the case of tissues of the heart, the lungs and other sides where the bodily region containing the tissue is moving. This is because the depth of field of a microscope is much smaller than the excursions of such tissue, so that in a stationary microscope the view would be in focus only a small proportion of the time. Also, the lateral excursions of the tissue are typically much greater than the field-of-view, so that the same tissue area cannot be observed throughout its excursions, as in viewing a small region on a beating heart. The region of the body immediately around the tissue under examination can be restrained, but the greater the degree of restraint, The greater the interference with normal functioning of the organism. A microscopic viewing system which permitted viewing with a minimum, if any, restraining of the organism would be extremely useful in research and clinical examinations, especially in examining the microcirculation of certain moving organs, such as the heart and lungs.

SUMMARY OF THE INVENTION

In accordance with one embodiment of the present invention, a microscope viewing system is provided which can maintain an The enlarged view of a moving area of an object. Teh system includes a beamsplitter assembly behind the objective lens for directing light onto a viewing device and onto the targets of two video cameras, one target located slightly in front of the image plane and the other target located behind the image plane. A separate focus sensing circuit connected to each video camera includes a band pass filter for passing only the frequency components in an optimum high frequency band of the video signal, a differentiator, a detector, and a low-pass filter for generating a DC signal whose magnitude represents the degree of focus of the corresponding camera. The low-pass filters of the two circuits are connected to a difference amplifier which generates a signal that drives a servo that moves the objective lens towards and away from the object.

One microscope system moves the objective lens in two lateral directions as well as axially, so that the same area of the object can be held in the field-of-view in spite of large lateral excursions of the area. The optical system for focusing the view onto the viewing device and video cameras includes a stationary transfer lens positioned behind the movable objective lens. The objective lens is maintained by the servo-system at a distance from the object equal to the focal length of the objective lens, so that light rays from the objective lens are collimated (parallel to one another). The transfer lens, which receives the collimated rays, is positioned in front of the image plane of the viewing device by a distance equal to the focal length of the transfer lens. Thus, as the objective lens moves laterally, the collimated rays from it may emerge from different positions, but these rays will always be precisely focused by the transfer lens onto the image plane of the viewing device.

The novel features that are considered characteristic of the invention are set forth with particularity in the appended claims. The invention will best be understood from the following description when read in connection with the accompanying drawings.

DESCRIPTION OF THE PREFERRED EMBODIMENTS

Figure 1:
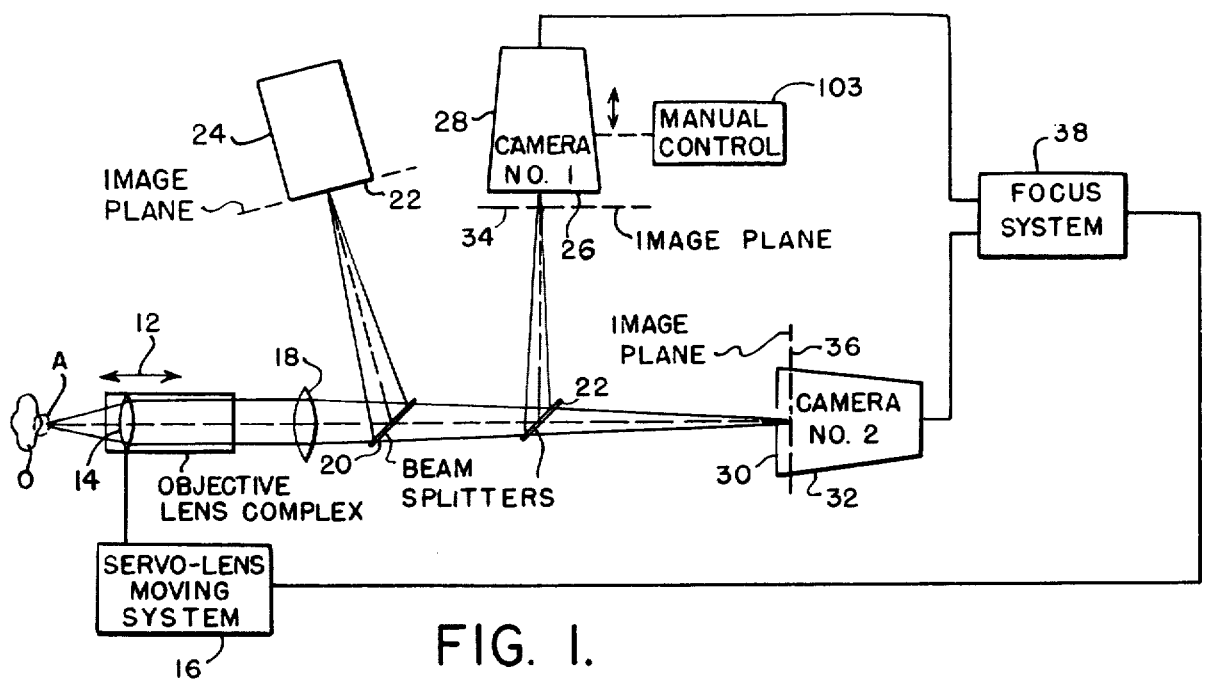
FIG. 1 is a block diagram view of a microscopic viewing system constructed in accordance with the invention.

FIG. 1 illustrates a microscopic viewing system 10 for viewing an area A of an object O, in which the area A may undergo large excursions along an axial direction indicated by arrows 12. The system includes an objective lens 14 which can be moved along the axial direction by a servo lens-moving mechanism 16. The mechanism 16 maintains the lens 14 at a distance from the object area A equal to the focal length of the objective lens 14, so that collimated light rays emerge from the objective lens and reach a stationary transfer lens 18 positioned behind the objective lens. A first beamsplitter 20, positioned behind the transfer lens, directs a fraction of the light onto the target 22 of a viewing device 24 which may be a video camera foro recording the view on video tape, a film camera, or an optical direct viewing device. The other fraction of the light passes through the beamsplitter 20 onto a second beamsplitter 22. Some of the light is reflected by the second beamsplitter 22 onto the target 26 of a first video camera 28, while the rest of the light passes through the second beamsplitter and reaches the target 30 of a second video camera 32.

The targets 26, 30 of the two video cameras are positioned close to the image planes 34, 36 where light from the transfer lens 18 is focused, each of these image planes 34, 36 being spaced from the transfer lens 18 by a distance (along the optical axis) equal to the focal length of the transfer lens 18. However, the target 26 of one camera is positioned slightly behind the image plane 34, while the target 30 of the other camera is positioned slightly in front of the image plane at 36. Thus, the image viewed by the two cameras is slightly out of focus. The video signals to generated by the two cameras 28, 32 are delivered to a focus sensing system 38 which processes the signals to generate a control signal which indicates the amount and the direction in which the objective lens 14 must be moved in order to bring the image on the viewing device 24 clearly into focus. The focus circuit 38 is connected to the servo lens moving mechanism 16 to move the objective lens 14 in a direction to return to an in-focus condition when the target area A moves out of focus.

Figure 2:
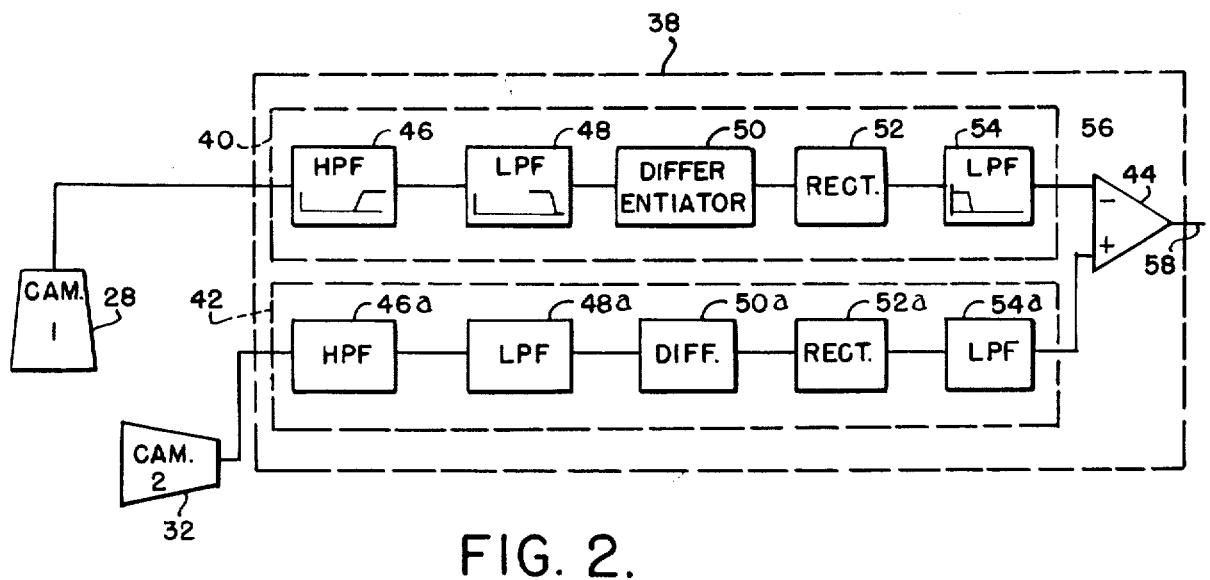
FIG. 2 is a block diagram of the focus circuits of FIG. 1.

FIG. 2 illustrates the focus system 38 which compares the outputs of the two video signals to develop a control signal for returning the sytem to an in-focus condition. The system includes two focus circuits 40, 42 respectively connected to the cameras 28, 32, and difference amplifier 44 connected to the outputs of the two focus circuits. Each focus circuit, such as 40, is designed to genrate a DC signal whose amplitude depends upon the degree of focus (or out-of-focus) of the image on the corresponding video camera. This is accomplished by utilizing the fact that video signals from an in-focus image contain the highest proportion of high frequency components. When an image is in focus on a camera, its target "sees" sharp details, so that there are sharp slopes in the resulting video signal. When the image becomes out of focus, the transitions in the image and hence the slopes in the video signal become less sharp. Accordingly, the differentiated video signals will provide smaller amplitudes in the case of an out of focus image.

The focus circuit 40 includes a high-pass filter 46 which passes only signals above certain frequency such as 100 KHz, these being the signals which change in the greatest proportion as the degree of focus changes. The output from the filter 46 passes through a low-pass filter 48 with a cutoff frequency such as 300 KHz, which is utilized to reject primarily noise in this system. The output of the low-pass filter 48 passes through a differentiator 50 which is utilized to generate the focus indicating portion of the signal, namely the amplitude of the video slopes. The output of the differentiator is detected by a rectifier circuit 52, and then passed to a low-pass filter 54 with a cutoff frequency such as 50 Hz. The low-pass filter 54 serves as an integrator to sum the rectified high frequency components so that a DC signal is developed which represents the magnitude of the slopes in the video signal. The output of the low-pass filter is delivered to the inverting input 56 of the differential amplifier 44. The other focus circuit 42 is similarly constructed, and it delivers its output to the non-inverting input of the differential amplifier 44. Thus, the output line 58 of the inverting amplifier represents the difference between the degree of focus of the two video cameras. This signal is delivered to the servo lens moving system 16 which moves the lens towards or away from the object so as to maintain the view in focus on the viewing device.

Figure 3A:
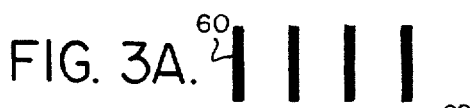
FIGS. 3A–3E illustrate a simplified video pattern, and the type of signals generated by the focus circuits of FIG. 2 when the pattern is in focus.
Figure 3B:
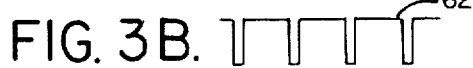
Figure 4B:
Figure 3C:
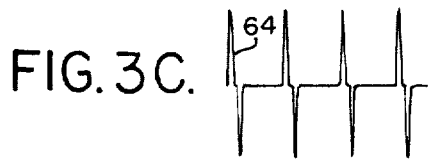
Figure 4C:
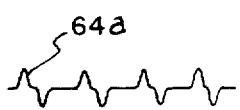
Figure 3D:
Figure 4D:
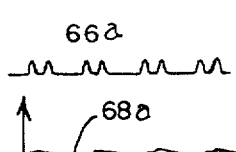
Figure 3E:
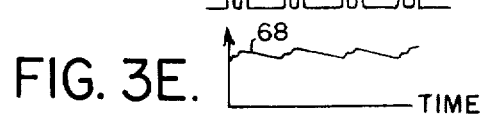
Figure 4E:
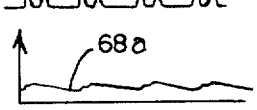

An understanding of the focus system 38 can be obtained by considering the types of signals generated by the various circuits of the focus system for a given video pattern. FIG. 3A represents s a video image which includes a series of vertical bars 60, which is presented only to illustrate the manner of operation of the invention. FIG. 3B illustrates the video signal generated by a camer viewing the bar pattern, while FIG. 3C illustrates the output of the differentiator through which the video signal is passed, which may be the differentiator 50 of FIG. 2. FIG. 3D illustrates the ouptut of the rectifier, such as 52, while FIG. 3E illustrates the output of the low-pass filter 54.

Figure 4A:
FIGS. 4A–4E are similar to FIGS. 3A–3E, but for an out-of-focus condition.

FIG. 4A illustrates the bar pattern 60a when it is somewhat out-of-focus. When the bars are out-of-focus, their edges do not appear to undergo such a sharp transition from light to dark, and therefore the video signal 62a undergoes changes which are less sharp. The differentiated signal at 64a is therefore smaller, as is the rectified 66a. After the rectified signal has passed through a low-pass filter, the signal 68a is obtained which is of smaller value than the in-focus signal 68. Thus, the DC signals 68 and 68a represent the degree of focus, and have valves determined by the degree of focus of the image on the video camera.

Figure 5:
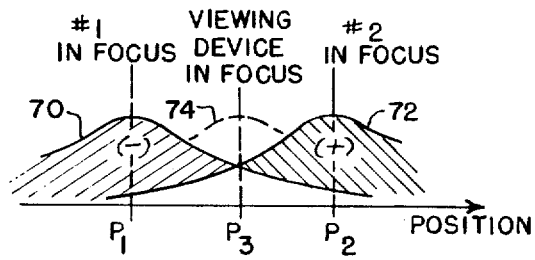
FIG. 5 illustrates the variation of the focus circuits outputs with distance of the video camera targets from the image plane.

FIG. 5 illustrates the manner of variation of the DC signal from each of the focus circuits, for various positions of the camera targets with respect to the focus plane of the image. The graph 70 represents the magnitude of the focus signal (such as signal 68), which is the output of the low-pass filter 54. When the focal plane of the image lies at the position $P_1$, it lies directly on the target of the first video camera 28, so that camera No. 1 is in focus and the DC focus signal is a maximum. With video camera No. 1 stationary, movement of the image plane in either direction away from the position $P_l$ results in a decrease in the DC signal 70. In a similar manner, the graph 72 represents the DC focus signal from the second camera 32. This focus signal 72 is greatest when the image plane lies at the positon $P_2$, and the signal decreases when the image plane away from this position. The system is designed to operate with the image plane at the position $P_3$ wherein the two video camera are equally out of focus. At this position, $P_3$, the two focus signals are equal, so that their difference is zero. The dashed line 74 represents an imaginary focus signal which would be obtained from the viewing device 24. The viewing device is positioned so that its target lies at the position $P_3$, and therefore the image thereon is in focus when the difference between the focus signals 70, 72 from the two video cameras is equal.

Figure 6:
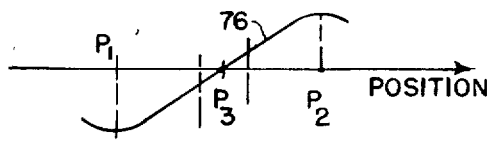
FIG. 6 illustrates the variation of the error signal delivered to the servo, with deviation from an infocus condition.

FIG. 6 illustrates the output of the difference amplifier 44, which represents the difference between the two focus signals 70, 72. This difference or control signal 76 not only passes through zero when the viewing device is in focus, but has a polarity which indicates the direction in which the objective lens 14 of the system must be moved to return the sytem to an in-focus condition. The error signal 76 varies almost linearly with position about the in-focus position $P_3$, and it increases with deviations from the in-focus position between the positions $P_1$ and $P_2$ at which the image planes passes the targets of the video cameras.

Figure 7:
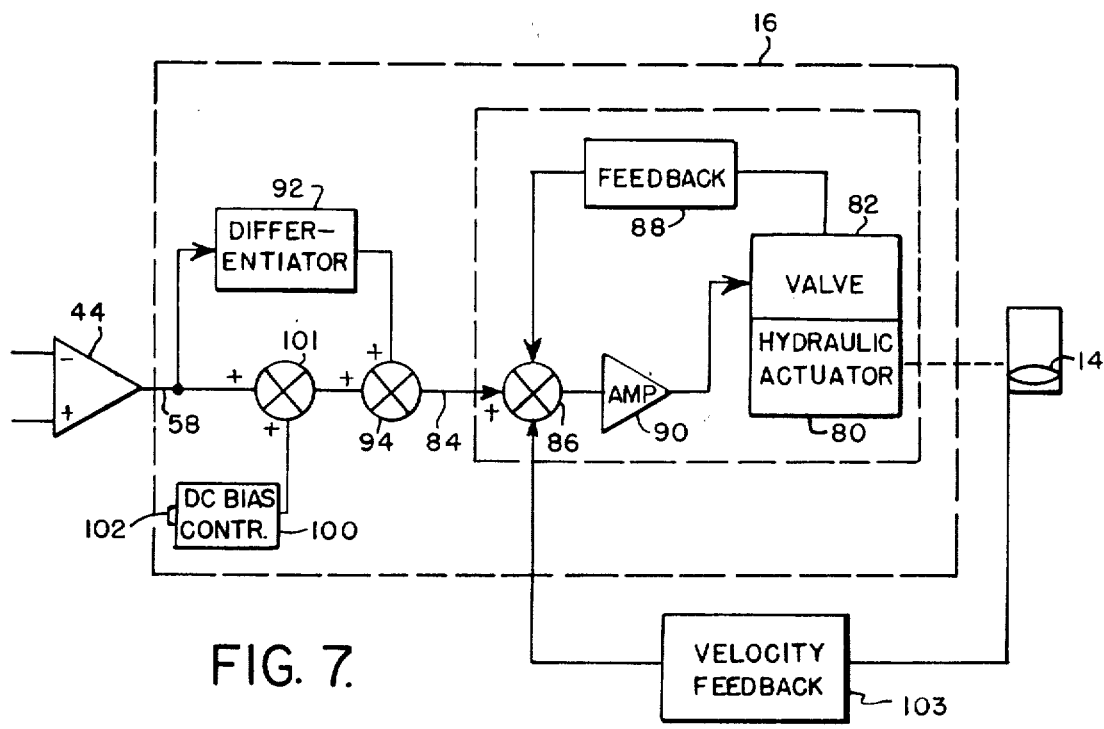
FIG. 7 is a block diagram representation of the servo of the system of FIG. 1.

FIG. 7 illustrates the servo lens moving system 16 which utilizes the error signal 76 generated by the difference amplifier 44 to move the objective lens 14. The servo system includes a hydraulic actuator 80 with a piston that can be moved in two directions by admitting pressurized fluid on either side of it, and a valve 82 which controls the flow of the hydraulic fluid. The valve is controlled by a signal from an amplifier 90 whose input is connected to an adder 86 which also receives the output of a feedback element 88, the signal on a line 84, and a velocity feedback signal from element 103. It would be possible to connect the differential amplifier 44 directly to the line 84 that controls the valve, so that the movement of the objective lens 14 was at a rate proportional to the deviation of the image plane from an in-focus position. However, better control is obtained by utilizing a differentiator 92 which generates the differential of the error signal from the differential amplifier 44. While the output of the differential amplifier 44 represents the position error of the objective lens, the output of differentiator 92 represents the time rate of change of the error (error velocity). By adding the position error on line 58 to the error velocity generated by differentiator 92 in a summing circuit 94, a control signal is obtained which permits the objective lens to be held closer to the in-focus position.

The focus system is typically set up to maintain the greatest degree of focus at the viewing device 24, that is, to maintain the greatest sharpness of detail. However, the tissue being studied may have considerable variations in height in the area being viewed, as compared to the depth of field of the system. It is often desirable to permit the physician or other operator to make slight adjustments in the distance between the objective lens and a given point of the viewed area, so that, for example, the details at the peaks of the 'terrain' can be brought into sharpest focus. The servo 16 shown in FIG. 7 includes a DC bias control 100 connected to an adder 101, which permits the addition of a small DC signal to the error signal entering the summing circuit 94. This results in effectively shifting the error signal 76 shown in FIG. 6 upward or downward by a slight amount, so that instead of the servo system seeking the position $P_3$, it seeks another point spaced a small distance therefrom. By turning a knob 102 or other manual control on the DC bias control 100, the physician can easily shift the focus point to bring the device into focus on any location within the viewed area.

Another method for making slight adjustments in the distance from the objective lens 14 to the point on the viewed area A is to shift the position of one of the video cameras 28 or 32 along the optical axis. However, such shifting also alters the range and sensitivity of the servo system, and the smooth mechanical movement of a delicate camera without introducing vibrations or other disturbances is generally more difficult than the movement of a rheostat wiper or the like. Movement of the video cameras is provided by a manual control 103 (FIG. 1), but this is usually done in setting up the system for a given application.

Figure 8:
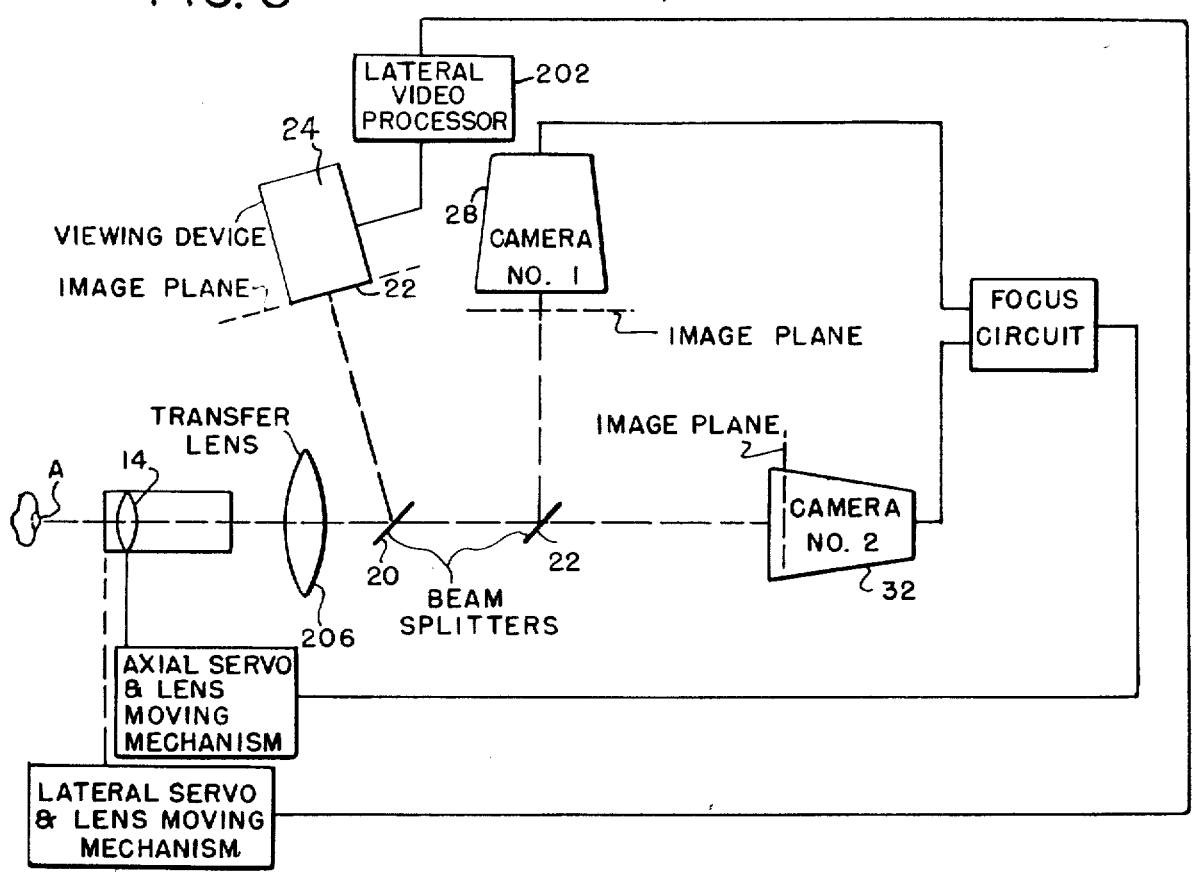
FIG. 8 is a block diagram view of a microscope viewing system constructed in accordance with another embodiment of the invention, for following an object area moving laterally as well as along the optical axis of the system.
Figure 9:
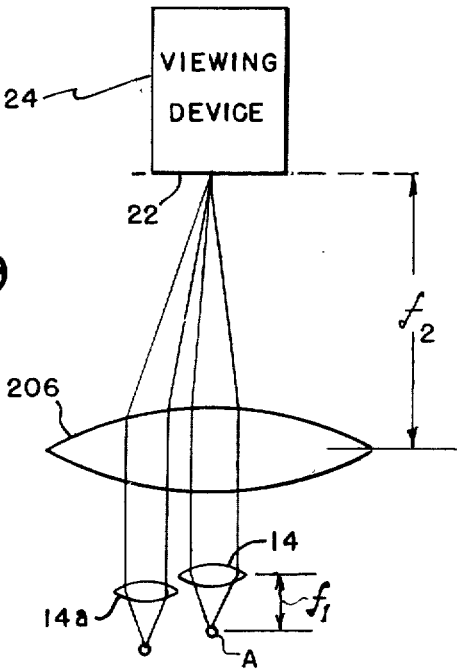
FIG. 9 is a side elevation view of the lens system of FIG. 8.

The microscope viewing system 10 is useful in situations where the area A to be viewed does not undergo large lateral excursions in addition to the axial excursions. Where large lateral excursions also occur, the system 200 illustrated in FIG. 8 can be utilized to keep the object area A constantly in the field of view as well as in focus. The system 200 is similar to the axial-moving system 10 of FIG. 1, except that a lateral video processor 202 is utilized to generate error signals indicating lateral shifting of the image. Also, an additional lateral servo and lens moving mechanism 204 is provided to move the objective lens laterally, and a larger transfer lens 206 is utilized. The lateral video processor is an off-the-shelf device manufactured by the DBA Company of Melbourne, Fla., which can be connected to the output of a video camera, and which generates signals indicating the direction of shifting of an image on the video target along two axes (the X and Y axes, which are perpendicular to the optical axis of the objective lens). Signals from the processor 202 are delivered to the servo mechanism 204 which includes hydraulic actuators that move the objective lens assembly in two lateral directions to correct for lateral shifting. In may be noted that the processor 202 can be connected to either of the video cameras 28, 32 that are normally slightly out of focus, although connection to the in-focus viewing device 24 is generally preferred. Both the processor 202 and lateral servo mechanism 204 are mechanisms well known in the art. However, a novel lens assembly is provided which includes the objective lens 14 and transfer lens 206, to permit extensive lateral excursions of the objective lens while maintaining the image unchanged on the viewing device 24.

FIG. 14 illustrates the optical system, which includes the objective lens 9 and large transfer lens 206, for maintaining an image of the object area A on the target 22 of the viewing device 24. The objective lens 14 is maintained at a distance $f_1$ from the object area A, so that light rays from the object area are collimated (parallel to one another) behind the objective lens. These collimated rays pass through the transfer lens 206, which focuses them on the viewing device 24 because the target 22 of the viewing device is spaced from the transfer lens 206 by a distance $f_2$ equal to the focal length of the transfer lens. When the objective lens 14 moves laterally as to the position 14a, the light rays leaving the objective lens are still collimated and they will still be imaged at the same location on the viewing device target 22. Also, the magnification of the image does not change as the objective lens 14 moves axially or laterally without rotation. Thus, it is only necessary to move a relatively light weight objective lens in order to maintain a stable and in-focus image on the viewing device inspite of large axial and lateral excursions of the object area A. The transfer lens 206 must have a diameter considerably larger, i.e., at least twice as large, as the diameter of the object lens 14 in order to accommodate large lateral excursions of the objective lens, and the transfer lens 206 preferably has a diameter at least five times as large as that of the objective lens.

Thus, the invention provides a microscopic viewing system which maintains an in-focus magnified view of a moving object area. Axial excursions of the object area are compensated by a focusing system which includes a pair of video cameras, the target of one camera being located in front of the image plane and the target of the other camera located behind the image plane. The video signals from the two focusing cameras are processed by focusing circuits to develop an error signal that indicates the direction of deviation from an in-focus condition, so that the objective lens of the system can be moved accordingly. A viewing system is also provided which can move the objective lens laterally to track the object area in large lateral excursions. This system employs a transfer lens much larger than the objective lens, to focus collimated rays from a variety of lateral positions of the objective lens. Of course, concave mirrors can be utilized as the lenses, to provide lens means, or optic means, for directing light, and prisms can be utilized as well as partially transmitting mirrors as the beamsplitter means.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. Microscope apparatus for viewing a moving area of an object comprising:
   lens means positioned behind the object;
   lens moving means for moving the lens means;
   viewing means positioned behind the lens means;
   first and second video camera means positioned behind the lens means for generating video signals, the first camera means positioned slightly behind the image plane of the lens means and the second camera means positioned slightly in front of the image plane of the lens means;
   beamsplitter means positioned behind the lens means and in front of the viewing means and the video camera means, to pass light to the viewing means and each camera means;
   first and second focus sensor circuits respectively connected to the outputs of the video camera means, each focus circuit including a first electrical filter for passing only predetermined high frequency components of the video signal, low pass filter means for integrating signals representing the high frequency components, and means for coupling the first filter to the low pass filter means;
   difference circuit means coupled to the outputs of the first and second focus means for generating a signal value representing the difference between the outputs of the low pass filter means of the two focus circuits; and
   servo means coupled to said difference means for energizing the lens moving means to move the lens means with a directional component toward and away from the object.

2. The apparatus described in claim 1 including:
   manually adjustable bias means for generating a variable bias signal; and
   means for coupling the bias means to the servo means, to add the bias signal to the difference between the outputs of the low pass filter means of the first and second focus circuits, whereby to enable slight change of the distance between the objective lens and object even as the object moves.

3. The apparatus described in claim 1 including:
   manually operable means coupled to one of said video cameras for varying its distance from the lens means.

4. The apparatus described in claim 1 wherein:
   said means, in each focus circuit, for coupling the first filter to the low pass filter means, includes a differentiating circuit and a detector.

5. The apparatus described in claim 1 wherein:
   said lens means includes a microscope objective lens positioned behind the object at a distance equal to the focal length of the objective lens, and a transfer lens positioned in front of the viewing means by a distance equal to the focal length of the transfer lens;
   said transfer lens is held stationary; and
   said lens moving means is coupled to the objective lens to move it while the transfer lens remains stationary.

6. Microscope apparatus for viewing a moving area of an object comprising:
   a microscope objective lens mounted for movement at least axially toward and away from the object;
   a transfer lens mounted behind the objective lens;
   beamsplitter means mounted behind the transfer lens;
   first and second video cameras mounted behind the beamsplitter means, at distances from the transfer lens respectively slightly greater and slightly less than the focal length of the transfer lens;
   first and second focus circuits respectively connected to the first and second cameras, each circuit including a bandpass filter for passing only predetermined frequency components of the video signal from its corresponding camera, a differentiator for generating the time derivative of the high frequency components, and a detector and low frequency filter circuit for integrating the derivative signal;
   a difference circuit connected to the two focus sensing circuits;
   a servo circuit for generating a drive signal dependent upon the output of the difference circuit; and
   a transducer connected to the servo circuit and mechanically coupled to the microscope objective lens, for moving the objective lens toward and away from the object.

7. Microscope apparatus for viewing a moving area of an object comprising:
   an objective lens behind the object and mounted to move axially toward and away from the object as well as laterally;
   a transfer lens of larger diameter than the objective lens and mounted behind the objective lens;
   viewing means mounted behind the transfer lens at a distance therefrom approximately equal to the focal length of the transfer lens, for detecting an image substantially focused at the viewing means; and
   lens moving means responsive to changes in the focus and position of the image at the viewing means for moving the objective lens, with respect to the transfer lens, laterally as well as axially towards and away from the object, to compensate for lateral and axial movements of the object area;
   said viewing means including a video camera for generating a video electrical signal, an electrical filter for passing only predetermined frequency components of the video signal, a differentiating circuit coupled to the filter, a detection means, a low pass filter for integrating the output of the detecting means, and means for generating a control signal of a magnitude dependent upon the output of the low pass filter means; and
   said lens moving means being constructed to move the lens axially in response to the control signal.

* * * * *